(12) United States Patent
Tanaka

(10) Patent No.: US 10,360,115 B2
(45) Date of Patent: Jul. 23, 2019

(54) MONITORING DEVICE, FAULT-TOLERANT SYSTEM, AND CONTROL METHOD

(71) Applicant: NEC Corporation, Minato-ku, Tokyo (JP)

(72) Inventor: Yukihiro Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 142 days.

(21) Appl. No.: 15/426,243

(22) Filed: Feb. 7, 2017

(65) Prior Publication Data
US 2017/0242760 A1 Aug. 24, 2017

(30) Foreign Application Priority Data

Feb. 18, 2016 (JP) ................................. 2016-028976

(51) Int. Cl.
*G06F 11/16* (2006.01)
*G06F 11/20* (2006.01)
*G06F 11/30* (2006.01)

(52) U.S. Cl.
CPC ...... *G06F 11/1629* (2013.01); *G06F 11/1608* (2013.01); *G06F 11/1616* (2013.01); *G06F 11/1637* (2013.01); *G06F 11/1654* (2013.01); *G06F 11/1662* (2013.01); *G06F 11/202* (2013.01); *G06F 11/2035* (2013.01); *G06F 11/3037* (2013.01)

(58) Field of Classification Search
CPC ............. G06F 11/1654; G06F 11/1608; G06F 11/1616; G06F 11/1629; G06F 11/1662; G06F 11/202; G06F 11/3037; G06F 11/1612; G06F 11/165; G06F 11/1637; G06F 11/2035
See application file for complete search history.

(56) References Cited

U.S. PATENT DOCUMENTS 4,882,752 A * 11/1989 Lindman ............... G06F 21/445
                                                        713/166
6,820,213 B1 * 11/2004 Somers ................. G06F 11/165
                                                        714/11

(Continued)

FOREIGN PATENT DOCUMENTS

JP   H02-114337 A   4/1990
JP   H05-189325 A   7/1993
(Continued)

OTHER PUBLICATIONS

Japanese Office Action for JP Application No. 2016-028976 dated Dec. 27, 2016 with English Translation.

*Primary Examiner* — Paul Contino

(57) ABSTRACT

A monitoring device is mounted in each of a plurality of operational systems constituting a fault-tolerant system. The plurality of operational systems have an identical configuration including a processor system. The monitoring device includes a processor. The processor executes instruction to read data from a predetermined storage area in a memory of an accessory device to be monitored, connected to the processor system. The processor further executes instruction to compare the read data with reference data held in advance. The processor further executes instruction to separate the processor system connected to the accessory device to be monitored from the fault-tolerant system when the read data is different from the reference data.

3 Claims, 9 Drawing Sheets

(56) References Cited

U.S. PATENT DOCUMENTS

| | | | | |
|---|---|---|---|---|
| 6,959,400 B2* | 10/2005 | Peleska | ............. | G05B 19/0428 714/6.32 |
| 8,140,893 B2* | 3/2012 | Niino | ................. | G06F 11/1679 714/11 |
| 8,443,230 B1* | 5/2013 | James-Roxby | ..... | G06F 11/1683 714/11 |
| 8,479,042 B1* | 7/2013 | James-Roxby | ..... | G06F 11/1683 714/11 |
| 2003/0041290 A1* | 2/2003 | Peleska | ............. | G05B 19/0428 714/47.1 |
| 2004/0010789 A1* | 1/2004 | Yamazaki | ........... | G06F 11/1687 718/102 |
| 2006/0149903 A1* | 7/2006 | Sugimoto | ........... | G06F 11/1658 711/127 |
| 2006/0150004 A1* | 7/2006 | Mizutani | ............. | G06F 11/1645 714/11 |
| 2008/0126885 A1* | 5/2008 | Tangvald | ........... | G06F 11/1076 714/54 |
| 2009/0030983 A1* | 1/2009 | Malaiyandi | ......... | G06F 11/1076 709/204 |
| 2009/0217092 A1* | 8/2009 | Weiberle | ............... | G06F 11/165 714/24 |
| 2011/0208948 A1* | 8/2011 | Knight | ................ | G06F 11/1497 712/31 |
| 2012/0036400 A1 | 2/2012 | Miller | | |
| 2012/0089751 A1* | 4/2012 | Baba | .................... | G06F 13/385 710/15 |
| 2013/0007513 A1* | 1/2013 | Traskov | ................ | G06F 11/165 714/10 |
| 2013/0024721 A1* | 1/2013 | Kabulepa | ............ | G06F 11/1641 714/5.1 |
| 2013/0262917 A1* | 10/2013 | Takemori | ............ | G06F 11/2028 714/4.11 |
| 2014/0082970 A1* | 3/2014 | Chang | .................... | A61N 2/004 36/136 |
| 2014/0298109 A1* | 10/2014 | Nishiyama | ............. | G11C 29/10 714/42 |
| 2016/0232063 A1* | 8/2016 | Das | ....................... | G06F 3/0619 |
| 2016/0283314 A1* | 9/2016 | Thanner | ............... | G06F 11/0793 |
| 2018/0081570 A1* | 3/2018 | Abe | ....................... | G06F 3/0655 |

FOREIGN PATENT DOCUMENTS

| | | |
|---|---|---|
| JP | 2007-026010 A | 2/2007 |
| JP | 2009-205630 A | 9/2009 |
| JP | 2012-038305 A | 2/2012 |

* cited by examiner

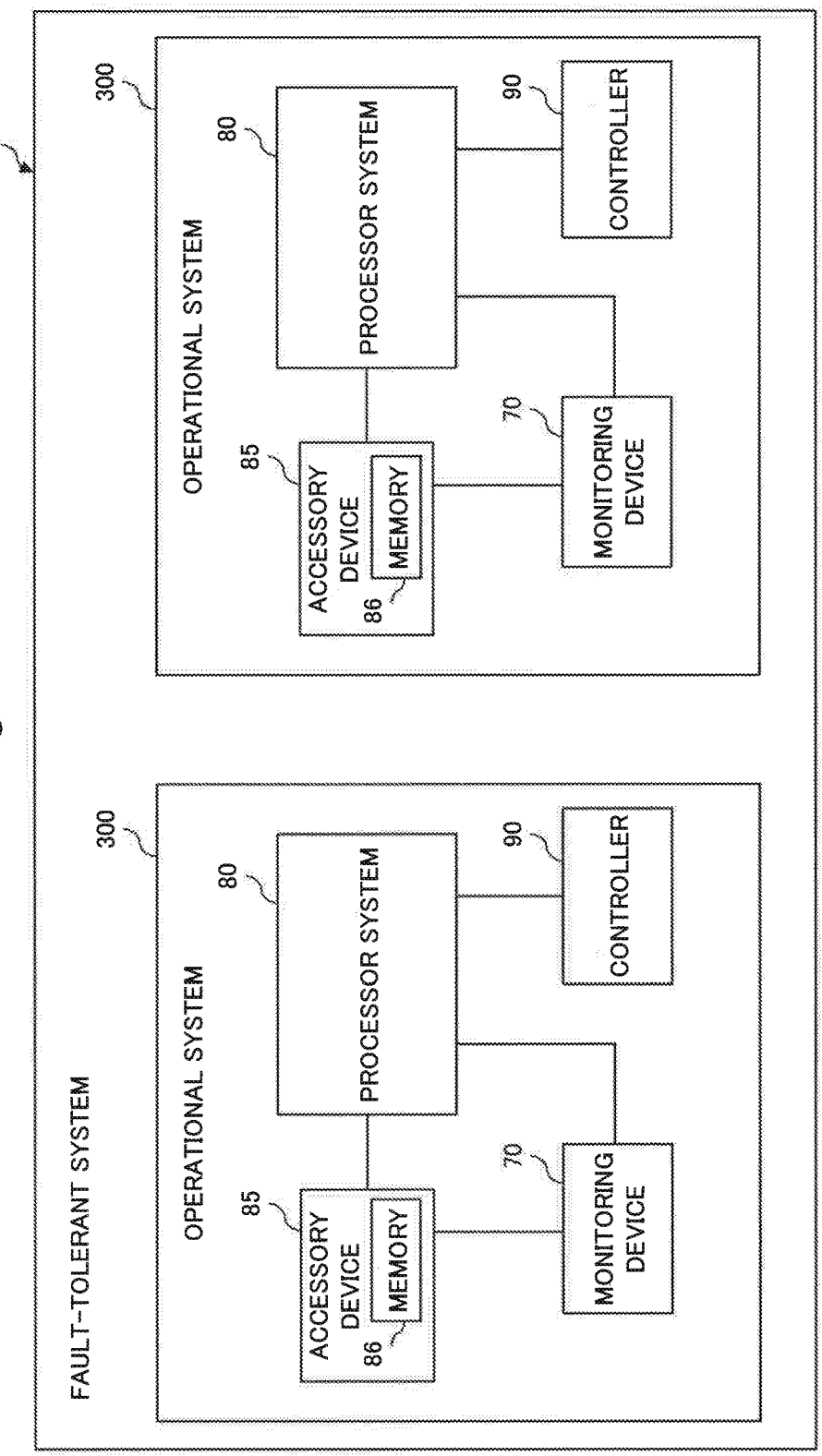

MONITORING DEVICE, FAULT-TOLERANT SYSTEM, AND CONTROL METHOD

This application is based upon and claims the benefit of priority from Japanese Patent Application No. 2016-028976, filed on Feb. 18, 2016, the disclosure of which is incorporated herein in its entirety by reference.

TECHNICAL FIELD

The present invention relates to a lockstep fault-tolerant system.

BACKGROUND ART

A fault-tolerant system is known as a technique for enabling continuation of service processed by a computer in operation by masking a hardware fault even when the fault occurs in the computer. A fault-tolerant system which uses the lockstep scheme is available as an exemplary fault-tolerant system. In the lockstep scheme, hardware components of the computer serve as multiple-system components. The respective systems including identical hardware components perform the same operation in synchronism at the same clock frequency. Performing the same operation in synchronism at the same clock frequency will also be referred to as a lockstep operation hereinafter. The status in which the same operation is performed in synchronism at the same clock frequency will also be referred to as a lockstep status hereinafter. The status in which the lockstep status fails to be maintained due, for example, to a fault will also be referred to as loss of lockstep hereinafter. In the lockstep scheme, even when one of a plurality of systems suffers a fault and causes loss of lockstep, the processing can be continued by the operations of the remaining normal systems.

An exemplary fault-tolerant system which uses such a lockstep scheme is disclosed in reference 1 (Japanese Unexamined Patent Application Publication No. 2009-205630).

The fault-tolerant system disclosed in the reference 1 includes a plurality of systems including identical hardware components. Each system includes a processor system including a CPU (Central Processing Unit), an I/O system including I/O (input/output) devices such as a storage device and a network device, and a controller. The processor system of each system performs a lockstep operation. The I/O system of each system is configured to maintain sufficient redundancy between the individual I/O systems by mirroring processing which uses the CPU of the processor system.

The controller determines whether an inconsistency has occurred in operation between the processor systems. The controller, for example, compares data to be transferred from the self-system processor system to the self-system I/O system with data to be transferred from the different-system processor system to the self-system I/O system. When an inconsistency occurs in these data, the controller separates a processor system determined in accordance with a predefined method from the fault-tolerant system.

An inconsistency may occur in the data when, for example, data flowing from the CPU is partially garbled, or the data timing becomes off. Further, the inconsistency may occur in the data when an abnormality occurs within the processor system performing the lockstep operation. It may be temporarily determined that a fault has occurred upon, for example, memory garbling due to the presence of external electrical noise, cosmic rays, or other types of radiation. In this case, the processor system detected to have the fault is separated from the fault-tolerant system. Various methods have been proposed to separate such a processor system. For example, a method is available for calculating levels of priority based on MTBF (Mean Time Between Failure) or a frequency of occurrence of faults of each processor system and determining the processor system to be separated based on the calculated levels of priority.

In this manner, with the lockstep fault-tolerant system, even when a processor system which may suffer the fault is separated, the processor systems of the remaining systems continue the processing. Then, when the separated processor system is determined to be normal or the like and is therefore mounted in the fault-tolerant system again, the processor system performs the lockstep operation again.

SUMMARY

It is the main object of the present invention to provide a technique to prevent a system crash or degradation in availability in a fault-tolerant system.

A monitoring device of the present invention includes a processor executing instructions to:
read data from a predetermined storage area in a memory, the memory being provided in an accessory device to be monitored, the accessory device connecting with a processor system of a fault-tolerant system including a plurality of operational systems, each operational system having an identical configuration including the processor system;
compare read-data which is read from the storage area with reference data held in advance; and
separate the processor system connected with the accessory device to be monitored from the fault-tolerant system when the read-data is different from the reference data.

A fault-tolerant system of the present invention includes:
a plurality of operational systems that have an identical configuration including a processor system and performs an identical operation,
each operational system including:
an accessory device connected with the processor system;
a monitoring device that monitors the accessory device; and
a controller that separates the processor system detected to suffer an abnormality from the fault-tolerant system when the abnormality of the processor system of the operational system is detected based on data output from the processor system of the operational system and data input from a different operational system,
the monitoring device including a processor executing instructions to:
read data from a predetermined storage area in a memory, the memory being provided in the accessory device to be monitored;
compare read-data which is read from the storage area with reference data held in advance; and
separate the processor system connected with the accessory device to be monitored from the fault-tolerant system when the read-data is different from the reference data.

A control method of the present invention includes:
reading data from a predetermined storage area in a memory, the memory being provided in an accessory device to be monitored, the accessory device connecting with a processor system of a fault-tolerant system including a plurality of operational systems, each operational system having an identical configuration including the processor system;

comparing read-data which is read from the storage area with reference data held in advance; and separating the processor system connected with the accessory device to be monitored from the fault-tolerant system when the read-data is different from the reference data.

BRIEF DESCRIPTION OF THE DRAWINGS

Exemplary features and advantages of the present invention will become apparent from the following detailed description when taken with the accompanying drawings in which:

FIG. 9 is a block diagram illustrating a simplified configuration of a fault-tolerant system in other example embodiments according to the present invention.

EXAMPLE EMBODIMENT

Example embodiments according to the present invention will be described below with reference to the drawings.

First Example Embodiment

Figure 1:
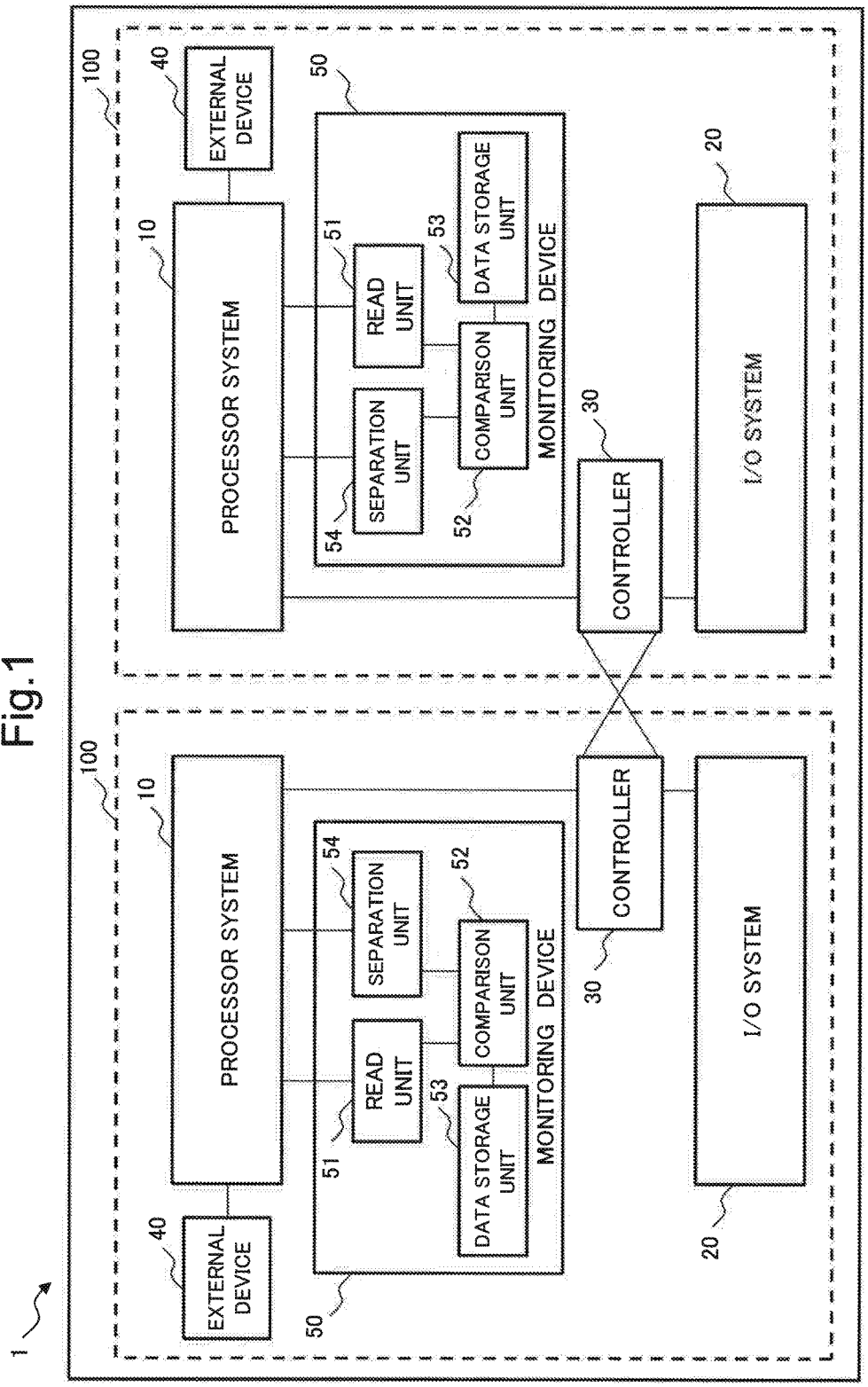
FIG. 1 is a block diagram illustrating a configuration of a fault-tolerant system in a first example embodiment according to the present invention.

FIG. 1 is a block diagram illustrating a configuration of a fault-tolerant system in a first example embodiment according to the present invention. Referring to FIG. 1, a fault-tolerant system 1 includes a plurality of systems (operational systems) 100. Although two systems 100 are illustrated in FIG. 1, the number of systems 100 included in the fault-tolerant system 1 is not limited.

Each system 100 includes identical hardware components. In other words, each system 100 includes a processor system 10, an I/O system 20, a controller 30, an external device (accessory device) 40, and a monitoring device 50. Although only one module is illustrated for each type of component constituting each system 100 in FIG. 1, the number of components of each type included in each system 100 is not limited.

Figure 2:
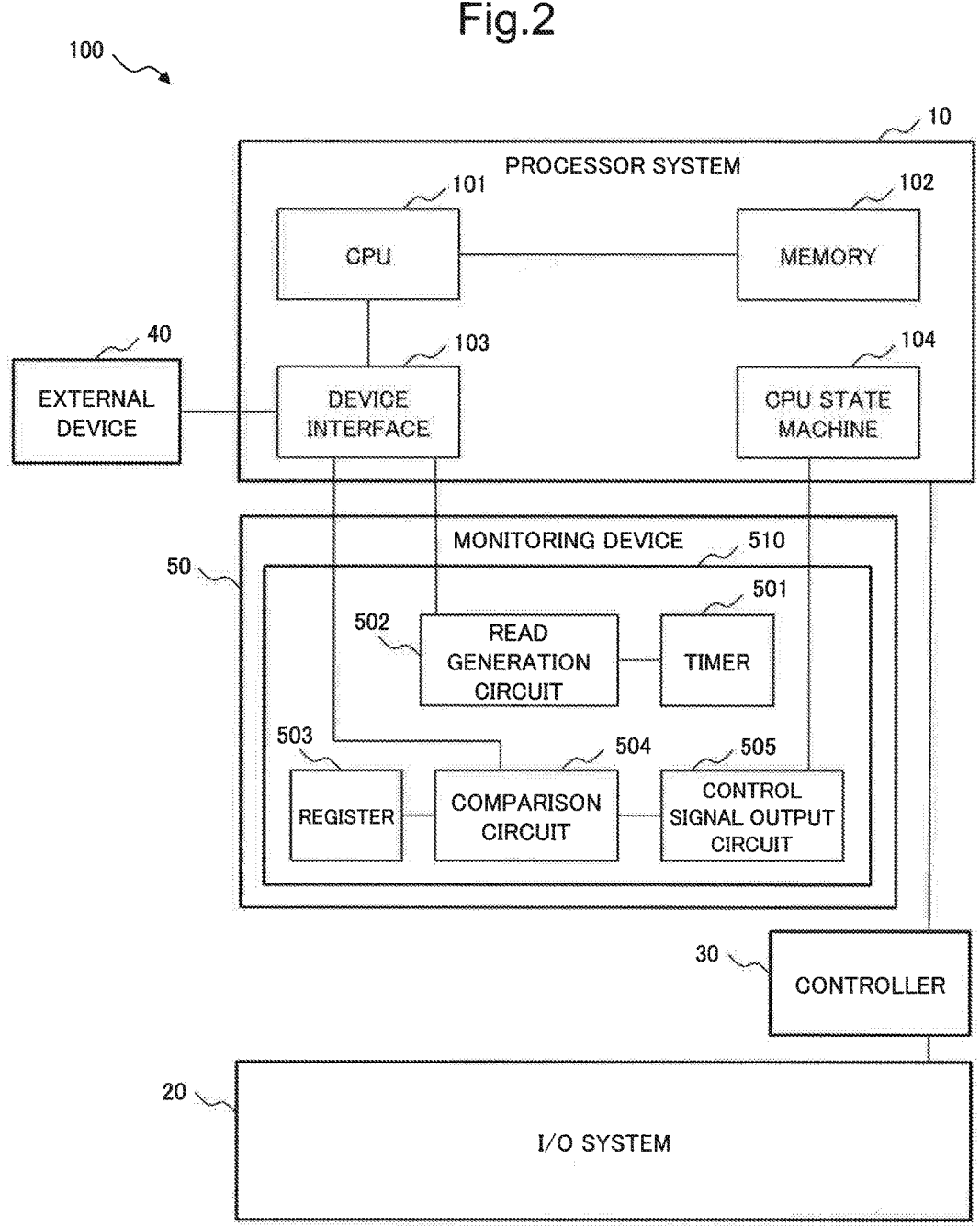
FIG. 2 is a block diagram illustrating exemplary hardware components constituting the fault-tolerant system in the first example embodiment.

The processor system 10 performs the lockstep operation in cooperation with the processor systems 10 of the different systems 100. More specifically, the processor system 10 includes a CPU (Central Processing Unit) 101, a memory 102, a device interface 103, and a CPU state machine 104, as illustrated in FIG. 2, as hardware components. A self-system means the system 100 including itself or a component included in the system 100 including itself. A different-system means the system 100 which does not include itself or a component included in the system 100 not including itself.

The CPU 101 performs the same operation in synchronism at the same clock frequency as it of the CPU 101 of the processor system 10 of different-system. The memory 102 functions as a main storage device and is kept in the same storage status as it of the memory 102 of the processor system 10 of different-system by the control operation of the CPU 101.

The processor system 10 is accessible to the I/O system 20 of self-system via the controller 30. The processor system 10 is also accessible to the I/O system 20 of different-system via the controllers 30 of self-system and different-system. The processor system 10 includes a function of transferring data to the I/O systems 20 of self-system and different-system.

The processor system 10 further includes a function of accessing the storage area of the external device 40. More specifically, the device interface 103 of the processor system 10 includes a function of writing data into the external device 40 or reading data from the external device 40 in accordance with a command from the CPU 101. The device interface 103 further includes a function of reading data from the external device 40 in accordance with a request from the monitoring device 50.

The CPU state machine 104 at least stores information representing whether the processor system 10 of self-system has been mounted in the fault-tolerant system 1 (also called an online status) or separated from the fault-tolerant system 1 (also called a broken status).

The I/O system 20 includes at least one I/O (Input/Output) device. The I/O system 20 is configured to maintain sufficient redundancy between itself and the I/O systems 20 of different-system by mirroring process implemented by software executed on the processor system 10.

The controller 30 is connected with the processor system 10 and the I/O system 20. The controllers 30 of the respective systems 100 are communicably connected to each other by cross-links. The controller 30 includes a function of monitoring whether the processor system 10 is in the lockstep status and determining whether the processor system 10 needs to be separated from the fault-tolerant system 1 in accordance with the monitoring result.

In other words, the controller 30 compares data flowing from the processor system 10 of self-system to the I/O system 20 of self-system with data flowing from the processor system 10 of different-system to the I/O system 20 of self-system. If a result of the comparison indicates a difference (in the case of the loss of lockstep), the controller 30 determines whether the processor system 10 of self-system needs to be separated from the fault-tolerant system 1. More specifically, the controller 30 determines that separation is necessary when it determines that the processor system 10 of self-system is more likely to suffer a fault than the different system. For example, the controller 30 may determine whether the processor system 10 of self-system is more likely to suffer a fault than the different system, based on the numbers of past separation and the numbers of recombining operations recorded for each processor system 10. The controller 30 includes a function of separating the processor system 10 of self-system from the fault-tolerant system 1 when it determines that the processor system 10 of self-system is more likely to suffer a fault than the different system.

The external device 40 includes a storage function. The external device 40 is implemented as, for example, a flash memory device. The external device 40 is connected to the processor system 10.

The monitoring device 50 includes a function of monitoring whether the external device 40 suffers a fault. The monitoring device 50 includes a read unit 51, a comparison unit 52, a data storage unit 53, and a separation unit 54 as functional units, as illustrated in FIG. 1.

The monitoring device 50 is implemented in a hardware configuration including a timer 501, a read generation circuit 502, a register 503, a comparison circuit 504, and a control signal output circuit 505, as illustrated in FIG. 2. The timer 501, the read generation circuit 502, the register 503, the comparison circuit 504, and the control signal output circuit 505 are formed in, for example, a processor 510. FIG. 2 merely illustrates an example and the hardware components included in the system 100 are not limited to these examples.

The read unit 51 of the monitoring device 50 includes a function of reading data from a predetermined storage area in the external device 40 for each predetermined timing. For example, the read unit 51 is implemented by the timer 501 and the read generation circuit 502 illustrated in FIG. 2 and controls the device interface 103 of the processor system 10 to implement its function. In other words, the timer 501 outputs a signal for determining a predetermined timing. The read generation circuit 502 outputs a read command for reading data from the predetermined storage area in the external device 40 to the device interface 103 at a timing based on the signal output from the timer 501. As a specific example, assume the external device 40 is implemented as a flash memory device. In general, a flash memory device stores SFDP (Serial Flash Discoverable Parameter). SFDP is represented by a 32-bit fixed value defined by JEDEC (Joint Electron Device Engineering Council) and is independent of a vendor. In this case, the read unit 51 outputs the read command in a storage area of SFDP via the device interface 103.

Data stored in the predetermined storage area of the external device 40 may be the fixed value which is not updated, as described above, or data updated by, for example, the processor system 10. In response to the read command from the read unit 51 (monitoring device 50), the device interface 103 reads data from the predetermined storage area in the external device 40 in accordance with the read command and transmits (sends back) the read data to the monitoring device 50.

The data storage unit 53 is implemented by the register 503 illustrated in FIG. 2. The data storage unit 53 stores reference data. The reference data means data to be compared with data read from the external device 40 by the read unit 51. For example, in the external device 40, when the fixed value is stored in the storage area from which data is read by the read unit 51, the fixed value is stored in the data storage unit 53 in advance. Assume, for example, that the external device 40 is implemented as a flash memory device and the SFDP area is defined as the storage area from which data is read by the read unit 51, as described earlier. In this case, the data storage unit 53 stores the value of SFDP.

The comparison unit 52 includes a function of comparing data (read-data) read from the external device 40 by the read unit 51 with reference data stored in the data storage unit 53. More specifically, the comparison unit 52 is implemented by the comparison circuit 504 illustrated in FIG. 2. The data (read-data) read from the external device 40 by the device interface 103 of the processor system 10 in accordance with the read command issued by the read unit 51 is input to the comparison circuit 504. The reference data in the register 503 (data storage unit 53) is further input to the comparison circuit 504. The comparison circuit 504 compares the read-data with the reference data and outputs a result of the comparison to the separation unit 54.

The separation unit 54 includes a function of separating the processor system 10 determined in accordance with predetermined separation conditions from the fault-tolerant system 1 when the comparison result obtained by the comparison unit 52 indicates a difference. More specifically, the separation unit 54 is implemented by the control signal output circuit 505 illustrated in FIG. 2 and controls the CPU state machine 104 of the processor system 10 to implement its function. The control signal output circuit 505 outputs a control signal to make a transition to a broken status to the CPU state machine 104 of the processor system 10, in response to a signal input from the comparison circuit 504 and indicating the difference. The control signal output circuit 505 outputs an OFF signal, a reset signal, or the like required in separation process to each hardware component constituting the processor system 10.

The operation of the fault-tolerant system 1 configured as described above will be described below with reference to the drawings.

When the fault-tolerant system 1 is started, the processor system 10 of each system 100 starts the lockstep operation. During the lockstep operation, the operation for monitoring the lockstep status by the controller 30 and the operation for monitoring the external device 40 by the processor system 10 are performed.

Figure 3:
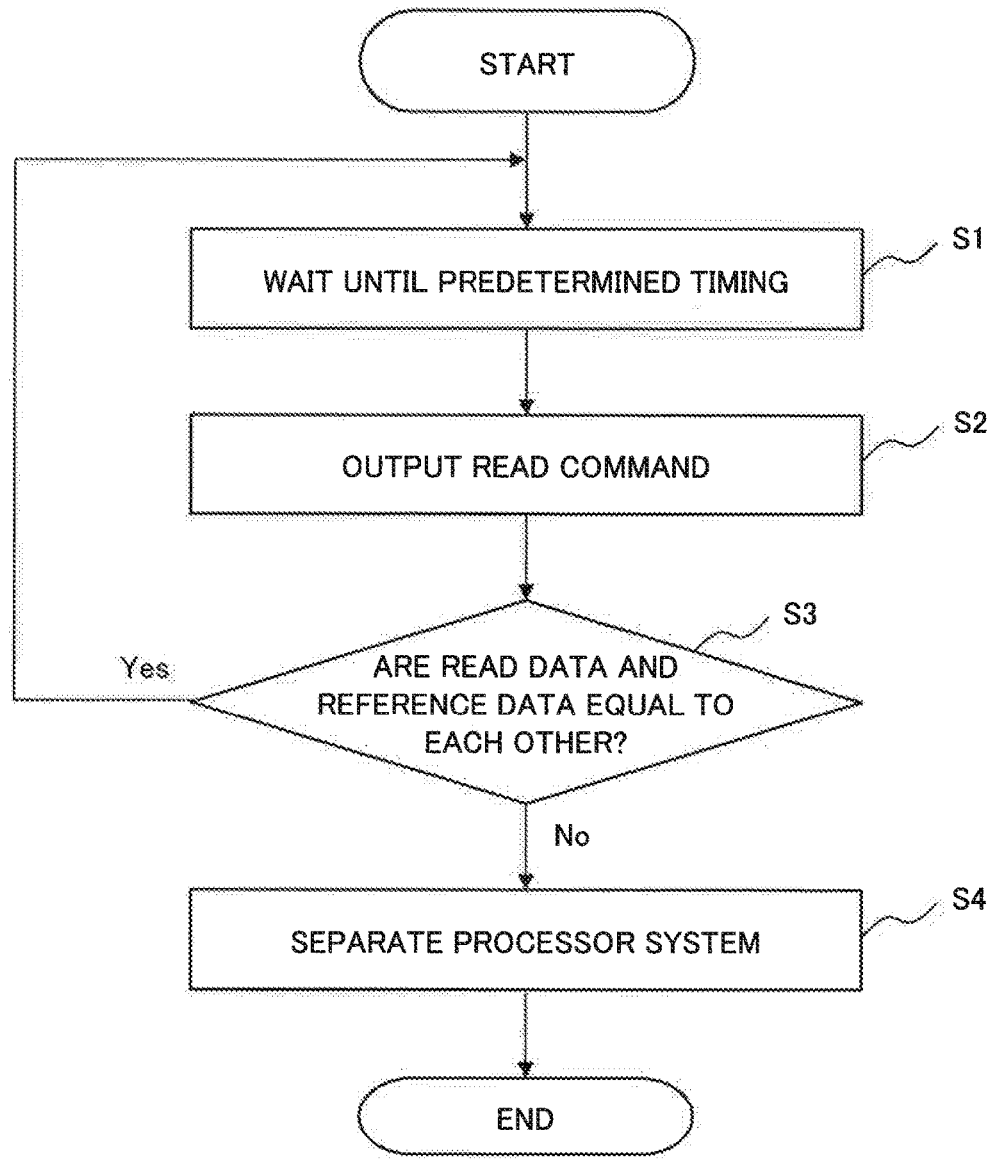
FIG. 3 is a flowchart for explaining an exemplary operation for monitoring an external device in the first example embodiment.

FIG. 3 is a flowchart illustrating an exemplary operation for monitoring the external device 40 by the monitoring device 50.

Referring to FIG. 3, the read unit 51 waits until a predetermined timing first (step S1).

The read unit 51 outputs the read command for reading data from the predetermined storage area in the external device 40 when the predetermined timing comes (step S2).

The comparison unit 52 determines whether the read-data read from the external device 40 in accordance with the read command issued by the read unit 51 and the reference data in the data storage unit 53 are equal to each other (step S3).

When the read-data and the reference data are equal to each other, the monitoring device 50 stands by to output the next read command. When the read-data and the reference data are not equal to each other, the separation unit 54 separates the process or system 10 of self-system from the fault-tolerant system 1 (step S4).

With this operation, the monitoring device 50 ends the operation for monitoring the external device 40. Subsequently, the fault-tolerant system 1 continues the processing using the processor system 10 of the unseparated system 100. When only one processor system 10 continues the processing, it operates without the operation (for example, the operation of the monitoring device 50) associated with the lockstep operation.

A specific example of the operation of the fault-tolerant system 1 will be described below.

Assume herein that the fault-tolerant system 1 includes two systems 100. For the sake of a better understanding, the two systems 100 are distinguished as systems 100a and 100b. In each of the systems 100a and 100b, a flash memory device is connected to the processor system 10 as the external device 40. The external device 40 (flash memory device) stores the BIOS (Basic Input Output System) code. In addition, the external device 40 stores SFDP and the data storage unit 53 of the processor system 10 stores the value of SFDP. The external device 40 includes no function of detecting and notifying a fault of its own. The frequency of access to the external device 40 by the CPU 101 is lower than that to the memory 102 by the CPU 101. The frequency of access to the external device 40 by the CPU 101 is as low as, for example, the frequency of reading the BIOS code from the external device 40 by the CPU 101 at the start or restart of the system 100. When the lockstep status of the systems 100a and 100b are lost, the processor system 10 of one of the systems 100a and 100b that has been separated and recombined more times in the past is separated from the fault-tolerant system 1 by the controller 30.

Under such conditions, in the fault-tolerant system 1, the external device 40 (flash memory device) of the system 100a is assumed to suffer a fault while the processor system 10 of each of the systems 100a and 100b normally performs the lockstep operation.

In the system 100a, the read-data read from the SFDP area in the external device 40 and the value of SFDP that is the reference data in the data storage unit 53 become different from each other.

The processor system 10 of the system 100a is thus separated from the fault-tolerant system 1 by the operation of the separation unit 54 of the monitoring device 50.

Subsequently, the processor system 10 of the system 100b continues the processing in the fault-tolerant system 1.

In this status, since the processor system 10 of the system 100b performs no lockstep operation, no operation associated with the lockstep operation in the system 100b is performed. In other words, even when the processor system 10 of the system 100b causes loss of lockstep due to the fault of the external device 40 of the system 100a, the controller 30 of the system 100b does not detect loss of lockstep. Therefore, the processor system 10 of the system 100b with its external device 40 suffering no fault is prevented from being separated from the fault-tolerant system 1 due to determination of loss of lockstep.

The operation of a fault-tolerant system equipped with systems 100a and 100b each including no monitoring device 50 will be described herein as a comparative example with respect to the fault-tolerant system 1 in the first example embodiment.

In this case, even when the external device 40 (flash memory device) accessed at a relatively low frequency in the system 100a suffers a fault, an error resulting from the fault is more likely to remain to be detected until the point in time at which the CPU 101 reads the BIOS at the restart of the system 100a. In the processor system 10 of each of the systems 100a and 100b, the loss of lockstep resulting from the fault of the external device 40 is detected by the controller 30. The processor system 10 of the system 100b with its external device 40 suffering no fault may be separated, depending on, for example, the numbers of past separation and the numbers of recombining operations. In this case, at the restart of the processor system 10 of the system 100a that continues the processing, the processor system 10 accesses the external device 40 suffering the fault to read the BIOS code. The processor system 10 of the system 100a detects the error resulting from the fault of the external device 40 and separates itself from the fault-tolerant system 1. As a result, the processor systems 10 of both the systems 100a and 100b are separated from the fault-tolerant system 1, resulting in the system crash.

In the first example embodiment, each of the systems 100a and 100b includes the monitoring device 50. The processor system 10 of the system 100a connected to the external device 40 suffering the fault is separated from the fault-tolerant system 1 by the monitoring device 50 before the loss of lockstep is detected by the controller 30. Therefore, the fault-tolerant system 1 can avoid the system crash resulting from a fault of the external device 40.

The fault-tolerant system 1 in the first example embodiment can more reliably prevent the system crash or degradation in availability resulting from the fault of the external device 40 connected to the processor system 10 that performs a lockstep operation.

The reason will be given below. In the first example embodiment, the monitoring device 50 which detects the abnormality of the external device 40 by monitoring the operation of the external device 40 is provided. The fault-tolerant system 1 in the first example embodiment can quickly detect the fault of the external device 40 and quickly separate the system 100 with its external device 40 suffering the fault from the fault-tolerant system 1. The fault-tolerant system 1 in the first example embodiment can reduce the possibility that the processor system 10 connected to the external device 40 suffering no fault will be separated from the fault-tolerant system 1 due to the fault of the external device 40. Therefore, the fault-tolerant system 1 in the first example embodiment can prevent the system crash or degradation in availability resulting from the fault of the external device 40.

Second Example Embodiment

A second example embodiment according to the present invention will be described below. In the description of the second example embodiment, the same reference numerals denote the same components as in the first example embodiment, and a repetitive description thereof will not be given.

The second example embodiment exemplifies the case where an external device without an area which stores a fixed value, as in SFDP of a flash memory device, is employed as the external device 40.

Figure 4:
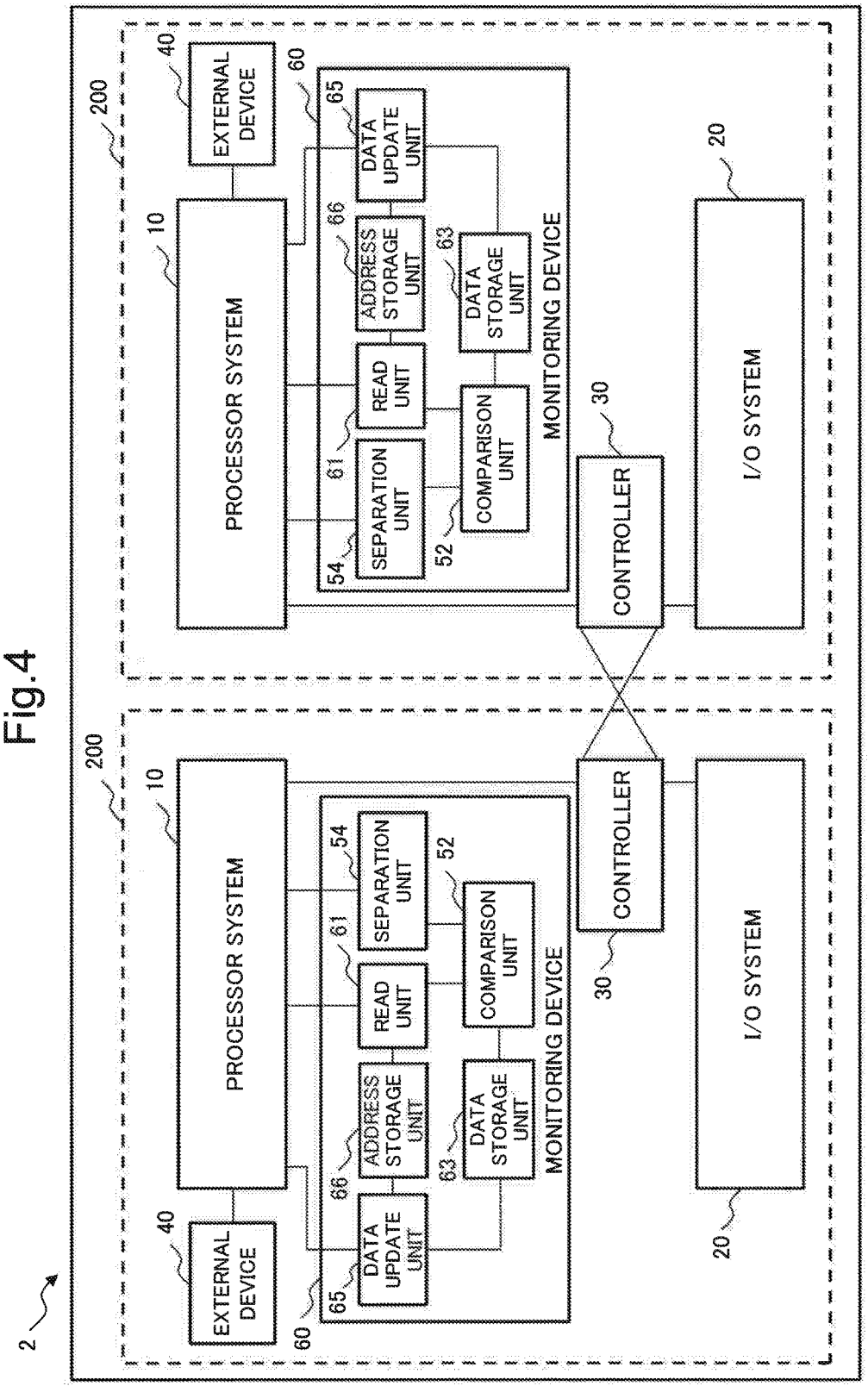
FIG. 4 is a block diagram illustrating a configuration of a fault-tolerant system in a second example embodiment according to the present invention.

FIG. 4 is a block diagram illustrating a configuration of a fault-tolerant system 2 in the second example embodiment. Referring to FIG. 4, the fault-tolerant system 2 includes a plurality of systems 200. Although two systems 200 are illustrated in FIG. 4, the number of systems 200 included in the fault-tolerant system 2 is not limited.

Each system 200 includes identical hardware components. Each system 200 includes a monitoring device 60 in place of the monitoring device 50 in the first example embodiment. The monitoring device 60 includes the comparison unit 52, the separation unit 54, a read unit 61, a data storage unit 63, a data update unit 65, and an address storage unit 66.

Figure 5:
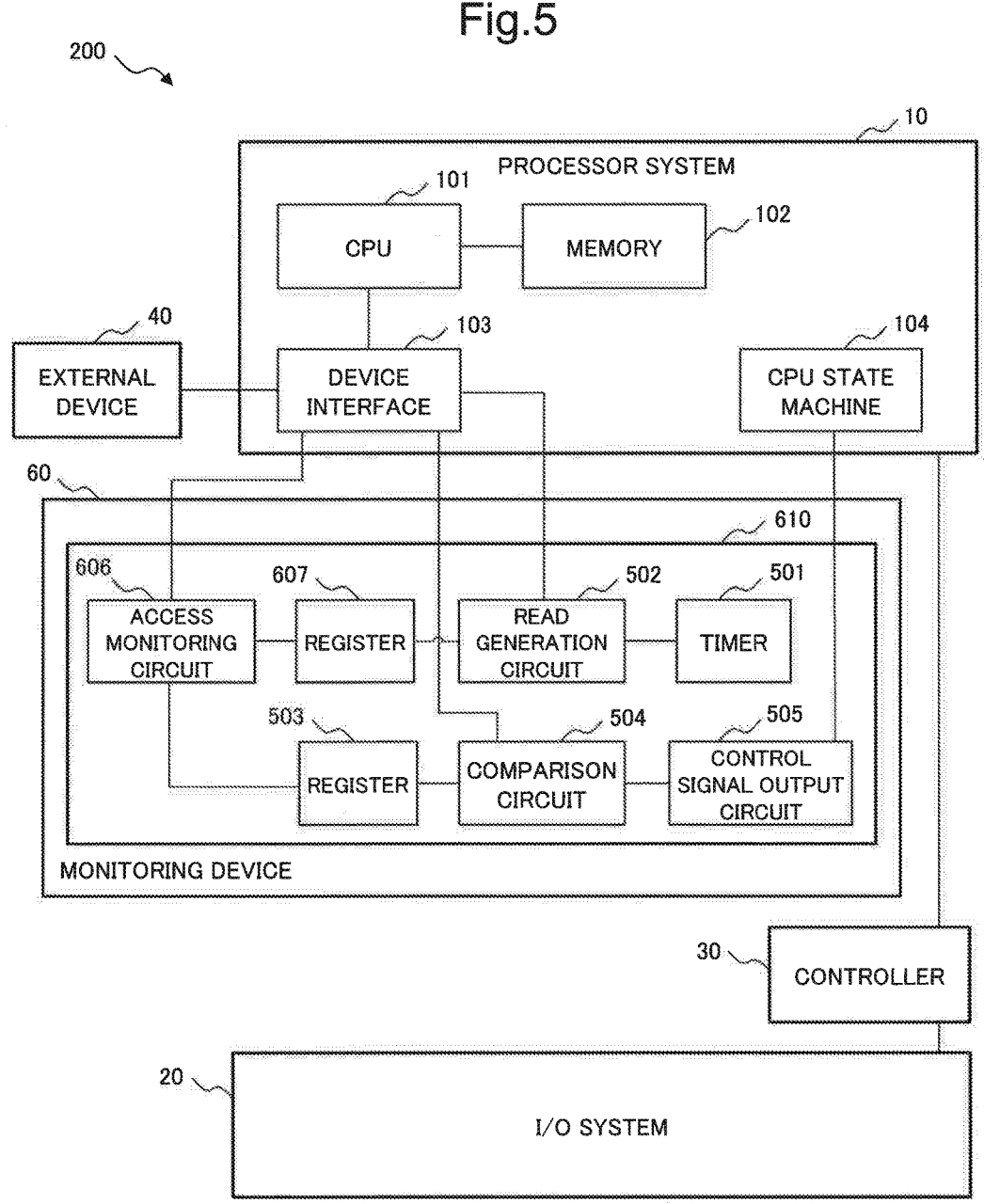
FIG. 5 is a block diagram illustrating exemplary hardware components constituting the fault-tolerant system in the second example embodiment.

Exemplary hardware components included in the system 200 are illustrated in FIG. 5. Referring to FIG. 5, the monitoring device 60 includes the timer 501, the read generation circuit 502, the register 503, the comparison circuit 504, the control signal output circuit 505, an access monitoring circuit 606, and a register 607. The timer 501, the read generation circuit 502, the register 503, the comparison circuit 504, the control signal output circuit 505, the access monitoring circuit 606, and the register 607 are built into, for example, a processor 610. FIG. 5 merely illustrates an example and the hardware components included in the system 200 are not limited to these examples.

The address storage unit 66 of the monitoring device 60 is implemented by the register 607 illustrated in FIG. 5. The data update unit 65 includes a function of storing in the address storage unit 66, the address of the access destination at which the processor system 10 accesses the external device 40 at a predetermined point in time. For example, the data update unit 65 is implemented by the access monitoring circuit 606 illustrated in FIG. 5 and controls the device interface 103 of the processor system 10 to implement its function. The predetermined point in time means herein, for example, the point in time at which the system 200 accesses the external device 40 for the first time after the start of the system 200.

The data update unit 65 includes a function of storing in the data storage unit 63, data identical to that stored in the storage area of the external device 40 accessed by the processor system 10 at the predetermined point in time as described earlier. When, for example, the processor system 10 at the predetermined point in time accesses the external device 40 to read data, the data update unit 65 stores the read data in the data storage unit 63. When the processor system 10 at the predetermined point in time accesses the external device 40 to write data, the data update unit 65 stores the data written in the external device 40 in the data storage unit 63.

The data update unit 65 further includes a function of, every time the data in the storage area of the external device 40 corresponding to the address stored in the address storage unit 66 is updated, updating the data in the data storage unit 63 to a updated-data updated in the external device 40. That the data in the storage area of the external device 40 is updated can be detected by the access monitoring circuit 606. In other words, the access monitoring circuit 606 can detect the update of the data in the external device 40 by detecting the write command input to the external device 40 and data to be written into it.

The read unit 61 includes a function of reading data from the storage area of the external device 40 corresponding to the address stored in the address storage unit 66, for each predetermined timing.

Configurations of the fault-tolerant system 2 in the second example embodiment other than the above-mentioned configurations are the same as those of the fault-tolerant system 1 in the first example embodiment. The operation of the fault-tolerant system 2 in the second example embodiment will be described below with reference to the drawings.

When the fault-tolerant system 2 is started, the processor system 10 of each system 200 starts the lockstep operation, as in the fault-tolerant system 1 in the first example embodiment. During the lockstep operation, the operation for monitoring the lockstep status by the controller 30 and the operation for monitoring the external device 40 by the monitoring device 60 are performed.

Figure 6:
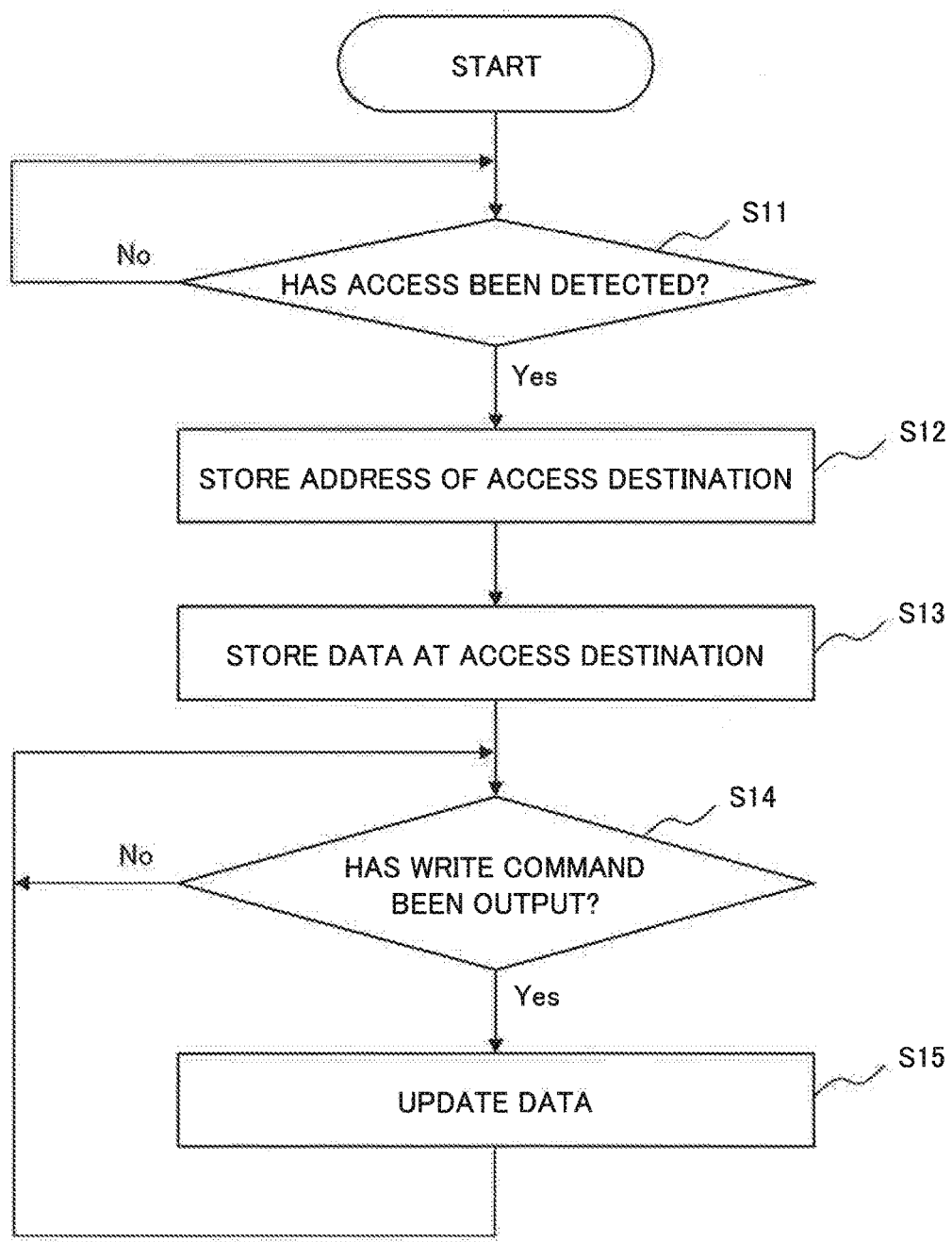
FIG. 6 is a flowchart for explaining an operation to update an address storage unit and a data storage unit in the fault-tolerant system of the second example embodiment.

FIG. 6 is a flowchart illustrating an exemplary data updating operation by the data update unit 65.

In the data updating operation illustrated in FIG. 6, first, the data update unit 65 determines whether the processor system 10 has accessed the external device 40 at the predetermined point in time (step S11). When the data update unit 65 detects that the processor system 10 has accessed the external device 40, it stores the address of the access destination in the address storage unit 66 (step S12).

The data update unit 65 stores in the data storage unit 63, data stored in the storage area at the access destination at which the processor system 10 accesses the external device 40 (step S13).

In doing this, when the processor system 10 reads data from the external device 40, the data update unit 65 stores the read-data in the data storage unit 63. When the processor system 10 writes data into the external device 40, the data update unit 65 stores the data in the external device 40 in the data storage unit 63.

The data update unit 65 determines whether the write command for writing data into the storage area of the external device 40 corresponding to the address stored in the address storage unit 66 has been output (step S14). Upon detection of the write command, the data update unit 65 updates the data in the data storage unit 63 to data to be written into the external device 40 in accordance with the write command (step S15).

The data update unit 65 repeats the operations in step S14 and the subsequent step.

Figure 7:
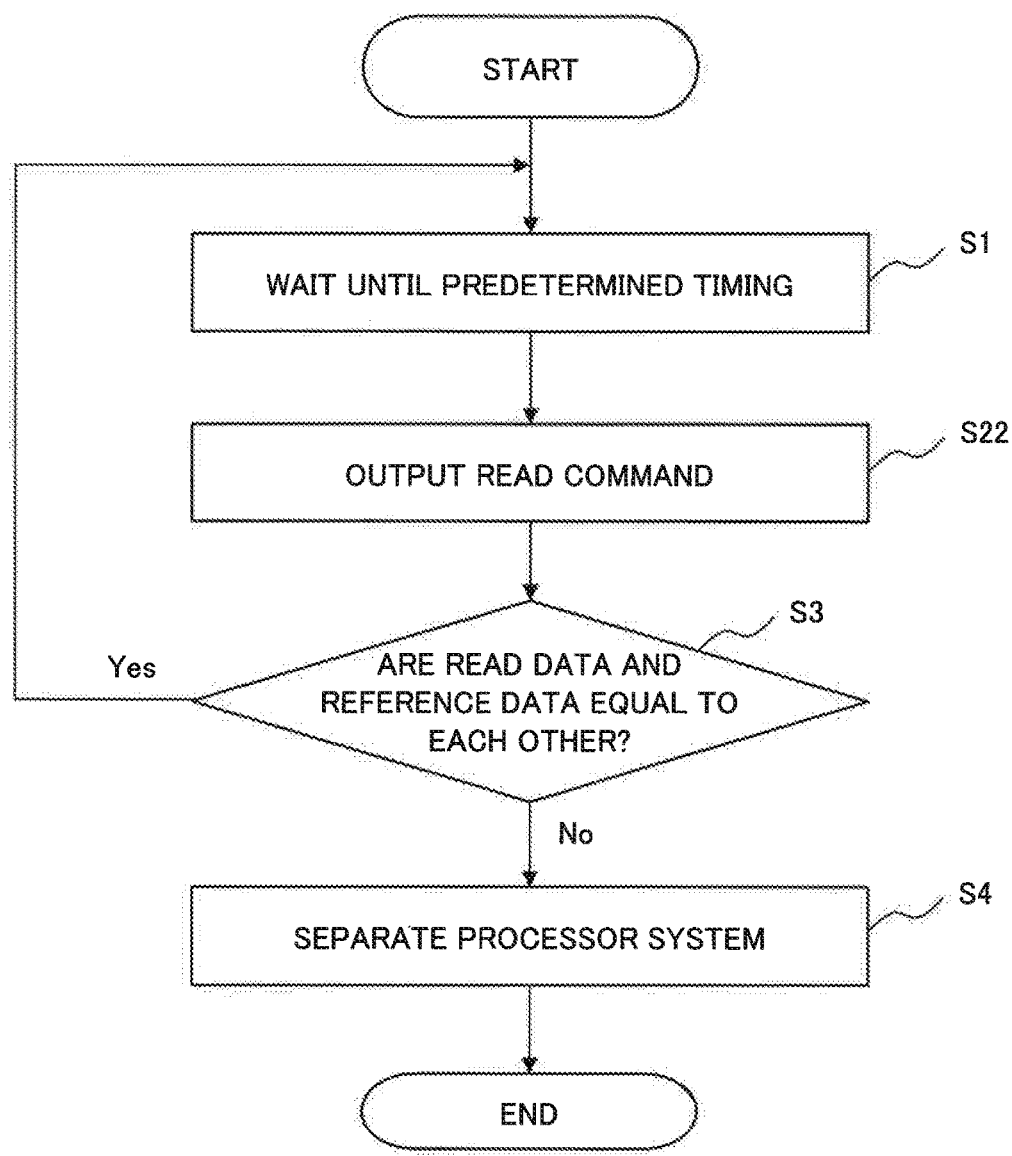
FIG. 7 is a flowchart for explaining an operation to monitor an external device in the second example embodiment.

FIG. 7 is a flowchart illustrating an exemplary operation for monitoring the external device 40 by the monitoring device 60 in the second example embodiment.

In the second example embodiment, when the predetermined timing is detected to have come (step S1), the read unit 61 outputs the read command for reading data from the storage area of the external device 40 corresponding to the address stored in the address storage unit 66 (step S22).

As in the operation for monitoring the external device 40 by the monitoring device 50 in the first example embodiment, the comparison unit 52 of the monitoring device 60 determines whether the read-data read from the external device 40 in accordance with the read command issued by the read unit 61 and the reference data in the data storage unit 63 are equal to each other (step S3).

When the read-data and the reference data are equal to each other, the monitoring device 60 stands by to output the next read command. When the read-data and the reference data are not equal to each other, the separation unit 54 separates the processor system 10 of self-system from the fault-tolerant system 2 (step S4). The monitoring device 60 thus ends its operation for monitoring the external device 40.

Subsequently, the fault-tolerant system 2 continues the processing using the processor systems 10 of the unseparated systems 200. When only one processor system 10 continues the processing, it operates without the operation (for example, the operation of the monitoring device 60) associated with the lockstep operation.

The fault-tolerant system 2 in the second example embodiment can more reliably prevent the system crash or degradation in availability resulting from the fault of the external device 40 even when a device without a storage area for a fixed value is connected as the external device 40.

The reason will be given below. The monitoring device 60 in the second example embodiment includes the data update unit 65, in addition to the configuration of the monitoring device 50 in the first example embodiment. The data update unit 65 includes the function of storing in the address storage unit 66, the address of the access destination at which the processor system 10 accesses the external device 40 at the predetermined point in time. The data update unit 65 further includes the function of storing in the data storage unit 63, the data in the storage area of the external device 40 corresponding to the address of the access destination as reference data. Every time the data in the storage area of the external device 40 indicated by the address stored in the address storage unit 66 is updated, the data update unit 65 updates the data in the data storage unit 63 to the updated data.

In this manner, in the second example embodiment, every time the data in the storage area of the external device 40 from which the comparison unit 52 reads data for each predetermined timing is updated, the reference data in the data storage unit 63 used by the comparison unit 52 is updated upon the update of this data. The fault-tolerant system 2 in the second example embodiment can obtain the same effect as in the first example embodiment even when the external device 40 such as a flash memory device before SFDP definition or a flash memory device without the storage area for the fixed value such as SFDP is mounted in it. In other words, the fault-tolerant system 2 in the second example embodiment can quickly detect the fault of the external device 40 and quickly separate the system 200 with its external device 40 suffering the fault from the fault-tolerant system.

The fault-tolerant system 2 in the second example embodiment can prevent the normal system 200 with its external device 40 suffering no fault from being separated from the fault-tolerant system, as in the first example embodiment. This reduces the system crash or degradation in availability resulting from separation of the system 200 with its external device 40 suffering the fault from the fault-tolerant system 2 after the normal system 200 is separated.

In the second example embodiment, the external device 40 is an external device without the area storing the fixed value. Instead, the configuration of the second example embodiment is also applicable to the fault-tolerant system which employs the external device (for example, a flash memory device including SFDP) including the area storing the fixed value as the external device 40.

Other Example Embodiments

The present invention is not limited to the first and second example embodiments and may take various example embodiments. For example, although the use of the flash memory device as the external device 40 has been taken as an example in the first and second example embodiments, the external device 40 is not limited to the flash memory device.

The first and second example embodiments give an example in which the controller 30 sets the system to be separated, based on the numbers of separation and remounting operations as a criterion for determining a system to be separated upon detection of the loss of lockstep. However, the criterion for determining the system (operational system) to be separated from the fault-tolerant system by the controller 30 is not limited to that described in the first and second example embodiments.

In the first and second example embodiments, the separation unit 54 is configured to separate the processor system 10 by causing the CPU state machine 104 to make a transition. However, the processing for separating the processor system 10 by the separation unit 54 and the configuration of the separation unit 54 for separating the processor system 10 are not limited to those described in the first and second example embodiments. The hardware configurations described with reference to FIGS. 2 and 5 are merely examples and the present invention is not limited to these examples.

The monitoring devices 50 and 60 in the first and second example embodiments need not always be physically independent devices (processors). For example, each of the monitoring devices 50 and 60 may be implemented as a part of an integrated circuit included in the hardware components constituting the processor system 10.

Each of the fault-tolerant systems 1 and 2 in the first and second example embodiments is a dual system including two systems 100 or 200. Instead, the fault-tolerant system to which the present invention is applied may be a triple or higher-order multiple system including three or more systems.

Figure 8:
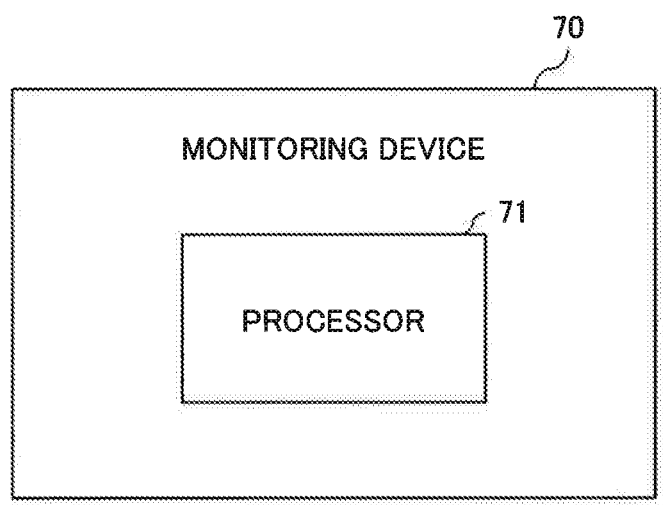
FIG. 8 is a block diagram illustrating a simplified configuration of a monitoring device in other example embodiments according to the present invention.

FIG. 8 is a block diagram illustrating the simplified configuration of a monitoring device in other example embodiments according to the present invention. A monitoring device 70 illustrated in FIG. 8 is mounted in, for example, a fault-tolerant system 3 in other example embodiments according to the present invention illustrated in FIG. 9. The fault-tolerant system 3 includes a plurality of operational systems 300. The plurality of operational systems 300 have the same configuration including a processor system 80. In the operational system 300, an accessory device 85 is connected to the processor system 80. The accessory device 85 includes a memory 86. A controller 90 includes a function of detecting an abnormality of the processor system 80 of the operational system 300 of self-system, based on data output from the processor system 80 of the operational system 300 of self-system and data input from the operational system 300 of different-system. The controller 90 further includes a function of separating the processor system 80 detected to suffer the abnormality from the fault-tolerant system 3 when the abnormality of the processor system 80 is detected.

The monitoring device 70 includes a processor 71. The processor 71 includes a function of reading data from a predetermined storage area in the memory 86 of the accessory device 85 to be monitored, connected to the processor system 80 of the operational system 300 of self-system. The processor 71 further includes a function of comparing the read-data with reference data held in advance to determine whether the read-data and the reference data are different from each other. The processor 71 further includes a function of separating the processor system 80 connected to the accessory device 85 to be monitored from the fault-tolerant system 3 when the read-data and the reference data are different from each other.

Such the monitoring device 70 illustrated in FIG. 8 and the fault-tolerant system 3 including the monitoring device 70 can prevent the system crash or degradation in availability resulting from the fault of the accessory device 85, as in the first and second example embodiments.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even when the claims are amended during prosecution.

The invention claimed is:

1. A monitoring device connected to a fault-tolerant system including a plurality of operational systems, each operational system having an identical configuration including a processor system, wherein the monitoring device is to:
read data from a predetermined storage area of an accessory device to be monitored for each predetermined timing of a plurality of predetermined timings, the accessory device connecting with the processor system of each operational system, the processor system of each operational system performing a lockstep operation in cooperation with the processor system of each other operational system;
compare read-data read from the storage area with reference data stored in advance;

separate the processor system connected with the accessory device to be monitored from the fault-tolerant system when the read-data is different from the reference data;
monitor whether the data stored in the storage area has been updated, based on an address of the storage area from which the data is read in the memory of the accessory device; and
when the data in the storage area has been updated, read updated-data which has been updated from the storage area and update the reference data to the updated-data.

2. A fault-tolerant system comprising:
a plurality of operational systems that each has an identical configuration including a processor system and that each performs an identical lockstep operation in cooperation with the processor system of each other operational system, wherein
each operational system includes:
 an accessory device connected with the processor system;
 a monitoring device that monitors the accessory device; and
 a controller that separates the processor system detected as having an abnormality from the fault-tolerant system when the abnormality of the processor system of the operational system is detected based on data output from the processor system of the operational system and data input from a different operational system, wherein
the monitoring device is to:
 read data from a predetermined storage area in a memory for each predetermined timing of a plurality of predetermined timings, the memory being provided in the accessory device to be monitored;
 compare read-data read from the storage area with reference data stored in advance;
 separate the processor system connected with the accessory device to be monitored from the fault-tolerant system when the read-data is different from the reference data;
 monitor whether the data stored in the storage area has been updated, based on an address of the storage area from which the data is read in the memory of the accessory device; and
 when the data in the storage area has been updated, read updated-data which has been updated from the storage area and update the reference data to the updated-data.

3. A control method comprising:
reading data from a predetermined storage area in a memory for each predetermined timing of a plurality of predetermined timings, the memory being provided in an accessory device to be monitored, the accessory device connecting with a processor system of a fault-tolerant system including a plurality of operational systems, each operational system having an identical configuration including the processor system that performs a lock step operation in cooperation with the processor system of each other operational system;
comparing read-data read from the storage area with reference data stored in advance;
separating the processor system connected with the accessory device to be monitored from the fault-tolerant system when the read-data is different from the reference data;
monitoring whether the data stored in the storage area has been updated, based on an address of the storage area from which the data is read in the memory of the accessory device; and
when the data in the storage area has been updated, reading updated-data which has been updated from the storage area and update the reference data to the updated-data.

* * * * *